United States Patent [19]

Veloso et al.

[11] Patent Number: 5,799,250
[45] Date of Patent: Aug. 25, 1998

[54] INTERFACE ARRANGEMENT FOR CONNECTING BASE STATIONS TO A PRIVATE BRANCH EXCHANGE

[75] Inventors: Artur Veloso, Göppingen; Klaus Geywitz, Gerlingen; Joachim Endler; Hans-Joachim Adolphi, both of Stuttgart, all of Germany

[73] Assignee: Alcatel N.V., Stuttgart, Germany

[21] Appl. No.: 621,206

[22] Filed: Mar. 22, 1996

Related U.S. Application Data

[63] Continuation of Ser. No. 238,306, May 5, 1994.

[30] Foreign Application Priority Data

May 11, 1993 [DE] Germany ............... 43 15 621.5

[51] Int. Cl.$^6$ ............................................. H04Q 7/24
[52] U.S. Cl. .................. 455/422; 455/552; 455/554; 455/555; 455/570
[58] Field of Search ...................... 455/422, 424, 455/426, 432, 403, 550, 552, 554, 555, 560, 561, 570; 370/438

[56] References Cited

U.S. PATENT DOCUMENTS 5,418,838  5/1995  Havermans et al. ............... 379/60

FOREIGN PATENT DOCUMENTS 0529359  3/1993  European Pat. Off. .

OTHER PUBLICATIONS

International Switching Symposium 1992, Bd. 1, 25 Oct. 1992, Yokoham (JP) Seiten 184–188, XP337640 K. Okamoto "A Study on Enchancement of Digital Cordless Telephone System in a PABX".

11th International Conference on Computer Communication, Genova (IT), 1992, 28. Sep. 1992, Amsterdam (NL) Seiten 617–622, XP406152 O. Freitag "Strategies for the Implementation of DECT Systems in ISPBX Networks".

Electrical Communication, 1993, Paris (FR) Seiten 172–180, XP368136, V. Werbus et al "Dect–Cordless Functionality in New Generation Alcatel PABXs".

*Primary Examiner*—Dwayne Bost
*Assistant Examiner*—Keith Ferguson
*Attorney, Agent, or Firm*—Ware, Fressola, Van Der Sluys & Adolphson LLP

[57] ABSTRACT

To also offer the possibility of mobile communication to branch exchange. The task of the invention is to present an interface arrangement between a private branch exchange and one or more base stations, at low cost for large numbers of existing base stations. To that effect, a microprocessor-controlled interface that maintains the DECT-Standard is offered, which shifts the majority of the functions from the one or more base stations to the branch exchange. A particularly cost-effective solution is obtained by making multiple use of component groups and dynamic channel assignment.

7 Claims, 2 Drawing Sheets

INTERFACE ARRANGEMENT FOR CONNECTING BASE STATIONS TO A PRIVATE BRANCH EXCHANGE

This is a continuation of copending application Ser. No. 08/238,306 filed on May 5, 1994.

TECHNICAL FIELD

The invention concerns an interface arrangement for connecting base stations to a private branch exchange, to which wired and/or wireless terminals can have access.

BACKGROUND OF THE INVENTION

The European Telecommunication Standard Institute ETSI has developed a Digital European Telecommunication Standard DECT-Standard for such systems, whereby wireless terminals can communicate with the private branch exchange via base stations. This DECT-Standard is the basis for business communication networks, principally for voice communication, but also to support the requirements of data traffic. DECT is a radio access process to fixed networks, which permits mobile communication in areas of high traffic density.

It is generally known to connect the base station with the private branch exchange through a switching subsystem or a radio network control unit. Such a solution has the advantage that the mobile part of the system can be retrofitted to existing private branch exchanges, and functions, from the private branch exchange point of view, like a number of subscribers who are connected to the private branch exchange by analog or digital line interfaces. However, the considerable circuit engineering cost is a disadvantage. This disadvantage is particularly noticeable in areas of high traffic density, such as for example in an office, where a large number of base stations are used, of which one base station serves a single cell in an environment of very small size cells. This created the desire to develop a cost-effective private branch exchange for both wireless and wired terminals for the special application of an office environment. Such installations are called WPABX—Wireless Private Area Branch Exchange.

SUMMARY OF THE INVENTION

The task of the invention is to present an interface arrangement that enables the realization of a low cost base station, while maintaining the DECT-Standard. This task is fulfilled by an interface arrangement for connecting base stations to a private branch exchange to which cordless terminals have access via a radio interface and base stations, characterized in that at least one base station is associated with an interface arrangement, with each base station connected via a line interface to a medium access control module and a microprocessor with associated memories associated with at least one MAC module, and that the MAC modules are connected jointly via a module for converting adaptive differential pulse code modulation to pulse code modulation and for echo cancellation to a system interface circuit which is connected by a system bus to the central processing unit of the private branch exchange.

The interface arrangement, briefly called DECT-interface, is an integral component of the wireless private branch exchange, and is connected to it by a special private branch exchange-system interface. Concentrating the functions of the DECT-interface and the base station in the DECT-interface, and the multiple use of several groups of components of the DECT-interface circuit and the private branch exchange, renders the construction of the base stations, which are available in large numbers, particularly simple and cost-effective. The low power consumption of the base station is a particular advantage with remote-supply.

BRIEF DESCRIPTION OF THE DRAWINGS

The invention will now be explained by means of a configuration example. In the pertinent drawings.

BEST MODE FOR CARRYING OUT THE INVENTION

Figure 1:
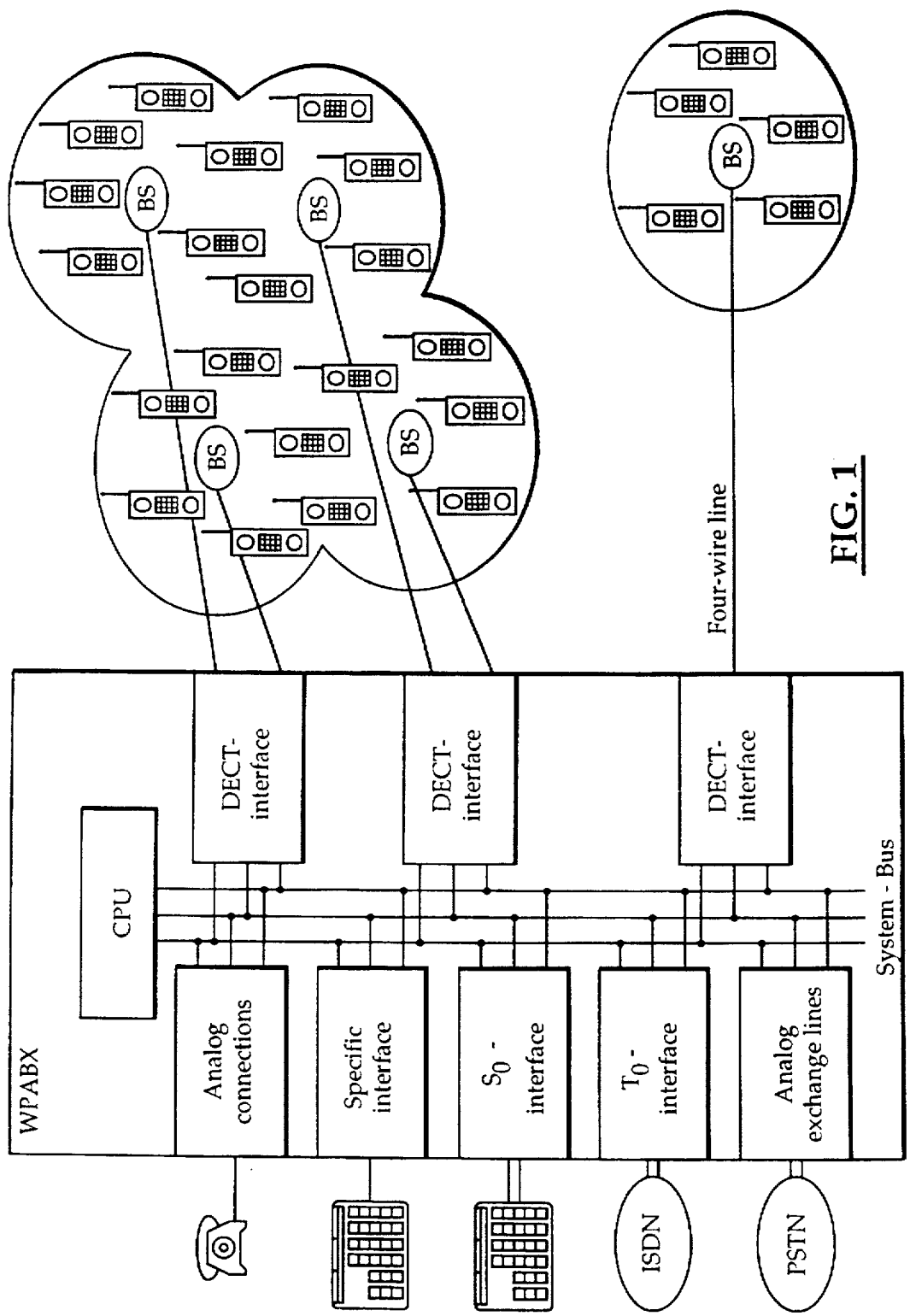
FIG. 1 is a configuration of a wireless private branch exchange.

According to FIG. 1, a wireless private branch exchange WPABX essentially consists of a central unit CPU, which manages different interfaces through a system bus. The wireless private branch exchange WPABX can be used as an autonomous installation for connecting wired and/or wireless terminals. However, it is also possible to connect the installation to existing networks. Connection to a Public Switched Telephone Network PSTN is possible through the interface for analog exchange lines, and the connection to an Integrated Service Digital Network ISDN can take place through the $T_o$-interface.

The base stations BS are connected to the DECT-interface through a four-wire line. Each base station supplies one radio station where it provides the radio link for wireless telephones. Each base station BS consists of a transmitter/receiver and a transmission circuit, which is connected to the DECT-interface. The base station is controlled, synchronized and remote-supplied through the transmission interface lines.

Figure 2:
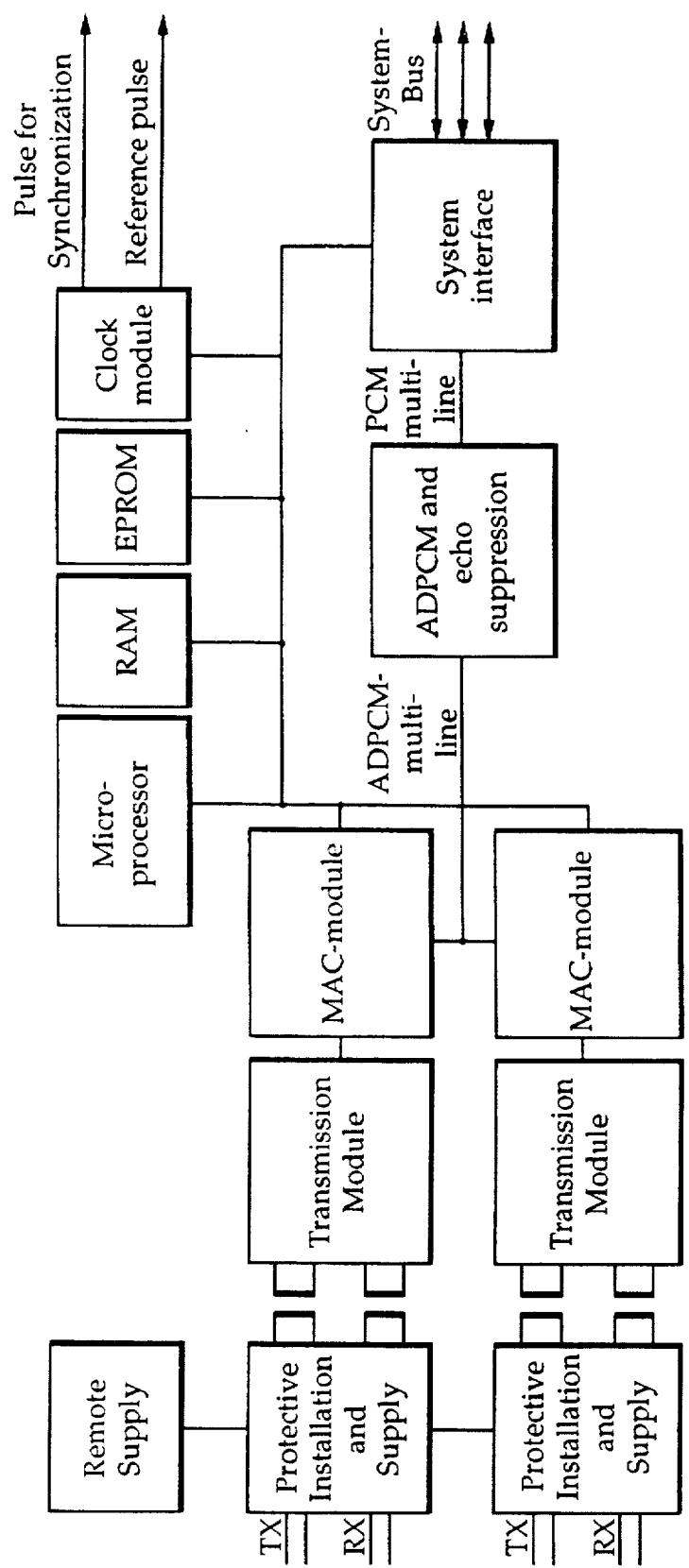
FIG. 2 is a block circuit diagram of an interface arrangement.

FIG. 2 depicts the interface arrangement according to the invention. In the present example, two base stations are connected to the interface arrangement. For each base station, the interface arrangement contains a line interface BS for connecting a wireless private branch exchange WPABX and a base station BS, a transmission module and a Medium Access Control Module "MAC-module", and a microprocessor with pertinent storage, a module for ADPCM and echo suppression, a system interface and a clock module, in common with the connected base stations BS.

Before calls can be made or received, the wireless telephone must receive information about the environment in which it operates, to decide whether the system can be accessed. To synchronize the wireless telephones with the wireless private branch exchange WPABX, a radio channel is always active in the base station BS, through which system information and the base station BS identification can be emitted. This permits every wireless telephone to recognize in which supply range it operates at the moment. In the idle position, the wireless telephone only answers to the base station BS with the largest field strength. After logging on to the wireless private branch exchange WPABX, it is decided which channel is best suited for the existing communication connection. In general, this is the channel with the least interference. A quick and interruption-free channel change is required when the subscriber changes location within a cell supplied by a base station, or when moving from one cell to another. This requirement is fulfilled by multiple use within the time multiplex system and a dynamic channel selection. A channel change takes place when another base station BS in the same series of cells emits a stronger signal than the actual station, or when another channel within the same cell appears to be better suited.

The MAC-module essentially performs the functions defined in the second of the four protocol layers of the DECT-Standard. This includes the selection of physical channels and the set-up and removal of the connections in these channels.

Physical channels are created by joining time slots and the carrier modulated by the data rate, which is selected from a spectrum of ten carrier frequencies.

Each base station assigned to a Mac-module consists of a transmitter/receiver, which can utilize each of ten carrier frequencies established in the DECT-Standard, thus enabling the operation of all 12 duplex time slots, which are established inside a 10 ms frame, while each time slot can operate independently at any of the ten carrier frequencies.

Basically, twelve time slots are provided for the direction of transmission from the base station BS to the handset, and the same number in the opposite direction of transmission. However, it is also possible to make an asymmetrical arrangement, for example when data are transmitted in one direction and only acknowledgement signals in the other.

Two MAC-modules are managed by one microprocessor, so that the number of channels per base station is adapted according to the need of channels requested from one cell by the so-called dynamic assignment of the channels. A module for converting the adaptive difference pulse code modulation into pulse code modulation, and the elimination of the near and far echo, is also provided for two MAC-modules.

The output capacity of the transmission interface between interface arrangement and base station BS is monitored by an Application-Specific Integrated Circuit ASIC by means of time control signals and error recovery.

The interface arrangement contains a clock module, which generates a highly accurate reference pulse, to which the system pulse is synchronized if no external synchronization takes place, for example from an ISDN. The system pulse is used by the clock module to keep all interface arrangements synchronized with the frames and multiframes. However, the reference pulse of the clock module is not active when the synchronization is performed by an external pulse, which for example is supplied by an ISDN. The ADPCM and echo suppression module further provides for passing a data communication directly through to the system interface module without performing the processing it performs for a voice communication, the ADPCM to PCM conversion and echo suppression.

What is claimed is:

1. An interface arrangement for connecting a plurality of base stations (BS), each serving an area called a cell, to a private branch exchange (WPABX) to which cordless terminals in a cell have access via a radio interface to the base station (BS) serving the cell for communication between the cordless terminals and the WPABX according to protocol of the DECT-Standard, characterized in that each of said base stations (BS) is connected via a line interface to a different, corresponding which performs protocol layer number two functions of the DECT-Standard, and thereby to a single microprocessor with associated RAM and EPROM; and further in that the MAC modules are connected jointly, via a module for converting adaptive differential pulse code modulation (ADPCM) to pulse code modulation (PCM) and for echo cancellation, to a system interface circuit, which is connected by a system bus to a central processing unit (CPU) of the private branch exchange (WPABX).

2. An interface arrangement as claimed in claim 1, characterized in that the base station (BS) is connected by a four-wire line to a module containing a protective device and a feed circuit, and in that this module is connected to the MAC module via a transmission module electrically isolated from the protective device and feed circuit.

3. An interface arrangement as claimed in claim 1, characterized in that each MAC module has a means for selecting a communication channel for a cordless terminal within its corresponding cell, establishes and releases a connection to said channel, and multiplexes and demultiplexes control information with information from higher-level protocol layers and with error information; and further in that a channel change within the cell served by a base station (BS), or within two different cells when moving from one cell to another, is managed by the MAC module associated with the one cell or the two MAC modules associated with the two cells so that the channel change is inaudible to a user of the cordless terminal.

4. An interface arrangement as claimed in claim 1, characterized in that one MAC module has a means for synchronizing all other MAC modules of the interface arrangement.

5. An interface arrangement as claimed in claim 1, wherein the available communication channels per base station are allocated dynamically by the single microprocessor with associated RAM and EPROM, according to the number of channels requested by each base station.

6. An interface arrangement as claimed in claim 1, wherein each MAC module is able to establish or break connections using any of the available 12 duplex 10-millisecond time slots at any of the ten carrier frequencies established in the DECT-Standard.

7. An interface arrangement as claimed in claim 6, wherein a MAC module uses a different number of time slots for transmission than for reception of signals.

* * * * *